US007443982B2

(12) United States Patent
Stone et al.

(10) Patent No.: US 7,443,982 B2
(45) Date of Patent: Oct. 28, 2008

(54) WATERMARKING AND TRANSFERRING MATERIAL

(75) Inventors: Jonathan James Stone, Reading (GB); Jason Charles Pelly, Reading (GB); Paul Gugenheim, London (GB); Isabel Delacour, Basingstoke (GB); Richard Foster, Fordingbridge (GB); Andrew Collins, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 778 days.

(21) Appl. No.: 10/006,481

(22) Filed: Dec. 6, 2001

(65) Prior Publication Data

US 2002/0080964 A1 Jun. 27, 2002

(30) Foreign Application Priority Data

Dec. 7, 2000 (GB) ................................. 0029851.3
Aug. 31, 2001 (GB) ................................. 0121202.6

(51) Int. Cl.
*H04K 1/00* (2006.01)
(52) U.S. Cl. ....................................... 380/255; 380/277
(58) Field of Classification Search ................. 380/255, 380/277, 200, 201; 713/200, 201, 1, 2, 188, 713/194; 176/2; 726/2
See application file for complete search history.

(56) References Cited

U.S. PATENT DOCUMENTS 5,185,733 A * 2/1993 Finkelstein et al. ...... 369/47.52

(Continued)

FOREIGN PATENT DOCUMENTS

CN 1226041 A 8/1999

(Continued)

OTHER PUBLICATIONS

John Garofalakis, et al., "Digital Robbery; Authors are not Unprotected", Computer Graphics International, XP-010291474, Jun. 22, 1998, pp. 558-563.

(Continued)

*Primary Examiner*—Kimyen Vu
*Assistant Examiner*—Joseph Pan
(74) *Attorney, Agent, or Firm*—Oblon, Spivak, McClelland, Maier & Neustadt, P.C.

(57) ABSTRACT

A system for watermarking and transferring watermarked material comprises a transaction server, first and second clients, first apparatus for applying a perceptible watermark to the material and second apparatus for removing the watermark. The server, clients and first and second apparatus are linked by one or more communications networks. The system is arranged to implement the steps of:

transferring from the transaction server to the first apparatus (i) data for creating a watermark, the creating data including (a) data defining an invertible algorithm and (b) data for creating at least one security key associated with the algorithm and (ii) data for creating a material identifier;

using the said first apparatus to apply a material identifier to the material and applying a watermark to the material, using the said creating data;

transferring from the first client to the transaction server the said material identifier and data for inverting the algorithm including the said at least one key;

transferring the watermarked material to the second apparatus;

deriving the said material identifier from the material;

transferring the identifier from the second client to the transaction server;

subject to predetermined conditions being satisfied, transferring from the transaction server to the second apparatus watermark removal data associated with the said material identifier, the removal data including at least one key and data defining an algorithm for removing the watermark in conjunction with the key; and using the second apparatus to remove the watermark using the said removal data.

27 Claims, 14 Drawing Sheets

U.S. PATENT DOCUMENTS

| | | | |
|---|---|---|---|
| 5,740,246 A | | 4/1998 | Saito |
| 6,122,403 A | | 9/2000 | Rhoads |
| 6,131,162 A | * | 10/2000 | Yoshiura et al. ............. 713/176 |
| 6,208,746 B1 | * | 3/2001 | Musgrave ................... 382/100 |
| 6,345,256 B1 | * | 2/2002 | Milsted et al. ................. 705/1 |
| 6,490,681 B1 | | 12/2002 | Kobayashi et al. |
| 6,577,858 B1 | * | 6/2003 | Gell ........................... 455/407 |
| 7,051,203 B1 | * | 5/2006 | Smith ......................... 713/168 |

FOREIGN PATENT DOCUMENTS

| | | |
|---|---|---|
| EP | 0 991 279 A2 | 4/2000 |
| JP | 8-185448 | 7/1996 |
| JP | 11-119651 | 4/1999 |
| JP | 11 234264 | 8/1999 |
| JP | 11-234264 | 8/1999 |
| JP | 2000-172648 | 6/2000 |
| JP | 2000 172648 | 6/2000 |
| WO | WO 97/14087 | 4/1997 |
| WO | WO 97 48084 | 12/1997 |

OTHER PUBLICATIONS

Marc A. Kaplan, "IBM Cryptolopes™, SuperDistribution and Digital Rights Management", 'Online! URL:http://www.research.ibm.com/people/k/kaplan/cryptolope-docs/crypap.html, XP-002132994, Dec. 30, 1996, 7 pages.

Ping Wah Wong, et al., "A Web-based Secure System for the Distributed Printing of Documents and Images", Images Processing, ICIP 98, XP-010308952, Oct. 4, 1998, pp. 2-6.

Eric A. Meyer, et al., "Borealis Image Server", Computer Networks and ISDN System, vol. 28, No. 11, XP-004018214, May 1, 1996, pp. 1123-1137.

Daniel Augot, et al., "Secure Delivery of Images over Open Networks", Proceedings of the IEEE, vol. 87, No. 7, XP-000914465, Jul. 1999, pp. 1251-1266.

James H. Wilkinson, et al., "Tools and Techniques for Globally Unique Content Identification", SMPTE Journal, vol. 109, No. 10, XP-000969315. Oct. 2000, pp. 795-799.

* cited by examiner

Statistics / Transaction log

Seller
Buyer
Content
Price
Total Sales
Total Price
Analysis by genre
Time expired material
Country / region analysis

WATERMARKING AND TRANSFERRING MATERIAL

BACKGROUND OF THE INVENTION

1. Field of the Invention

The present invention relates to watermarking material and to transferring watermarked material.

Material means one or more of image material, audio material and data material. Image material is generic to still and moving images and includes video, whether compressed or not.

This specification uses the terms "seller" and "buyer" in relation to such material for convenience and ease of description. It will be appreciated that those terms do not simply mean someone (seller) who transfers outright ownership to someone else (buyer) for a consideration usually money. Often, material is licensed to a user (buyer) by a licensor (seller) who allows the licensee to use the material in accordance with defined terms or business rules. Thus the terms seller and buyer have more general meanings and include intermediaries acting on behalf of other persons who may be the ultimate owners of the material and the ultimate users thereof.

2. Description of the Prior Art

It is known to watermark material. Data may be embedded as a watermark in the material. A watermark may be imperceptible or perceptible in the material. The present invention uses perceptible watermarks and optionally may also use imperceptible watermarks.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. The present invention uses robust watermarks. Watermarks may be "fragile" in that they are easily damaged by processing which is useful to detect attempts to remove the mark or process the material.

It is known to offer watermarked images for sale over the internet. Watermarked images may be downloaded for inspection and for examination for suitability for the users'desired purpose. If the user wishes to purchase an unwatermarked image, the user agrees to conditions of sale, for example an end user License, and pays for the image e.g. by credit card. The user is then able to download the unwatermarked image. See for example http://www.eyewire.com/help/.

SUMMARY OF THE INVENTION

It is desirable to provide a system in which one user (e.g. a seller) is provided with a system for watermarking material and another user (e.g. a buyer) is provided with a secure method and system for removing the watermark, together with a secure system for transferring watermarked material between sellers and buyers.

According to one aspect of the present invention, there is provided a method of watermarking and transferring watermarked material in a system comprising a transaction server, first and second clients, first apparatus for applying a perceptible watermark to the material and second apparatus for removing the watermark; the method comprising the steps of:

transferring from the transaction server to the first apparatus (i) data for creating a watermark, the creating data including (a) data defining an invertible algorithm and (b) data for creating at least one security key associated with the algorithm and (ii) data for creating a material identifier;

using the said first apparatus to apply a material identifier to the material and applying a watermark to the material, using the said creating data;

transferring from the first client to the transaction server the said material identifier and data for inverting the algorithm including the said at least one key;

transferring the watermarked material to the second apparatus;

deriving the said material identifier from the material;

transferring the identifier from the second client to the transaction server;

subject to predetermined conditions being satisfied, transferring from the transaction server to the second apparatus watermark removal data associated with the said material identifier, the removal data including at least one key and data defining an algorithm for removing the watermark in conjunction with the key; and using the second apparatus to remove the watermark using the said removal data.

The method allows originators or owners of material to offer it for sale to buyers in a secure manner. The transaction processor allows many sellers to offer material for sale and for many buyers to buy. The transaction processor allows sellers, who have access to a first client and access to a watermarking apparatus to design and apply secure watermarks without needing to know how, in detail, the watermarking is achieved. Thus apart from knowing how to co-operate with the server, the sellers do not require skills special to watermarking. Likewise buyers who have access to a second client and a watermark removal apparatus do not need such special skills to remove watermarks once they have complied with the said predetermined conditions.

The security key provides security against unauthorised removal of the watermark. The data for inverting the algorithm including the said at least one key is transferred to the transaction processor, without such data being on or with the material thereby providing further security.

In a preferred embodiment, the data for applying the algorithm including the said at least one key is stored in data carrier, most preferably a smart card. The smart card co-operates with the first apparatus during compression to apply the watermark. The smart card is used to securely transfer the data for inverting the algorithm including the said at least one key from the first apparatus to the first client for transfer to the transaction server.

The said watermark creating data may be stored on data carrier, most preferably a smart card, in response to a request for the data sent from the first client to the transaction processor. In one embodiment the said data is transferred from the transaction server to the first client and then to the smart card. In another embodiment the smart card, with the creation data stored thereon, may be sent to the operator of the first apparatus by e.g. post.

The said watermark removal data may likewise be transferred from the transaction server to the second apparatus in a data carrier, most preferably a smart card.

In one embodiment the said data is transferred from the transaction server to the second client and then to the smart card. In another embodiment, a request for the said data is received by the transaction processor and the said data is stored on the smart card and the card is sent to the operator of the second apparatus, e.g. by post.

The watermarked material may be transferred from the first apparatus to the second on a recording medium, for example a disc or tape, by for example post. Alternatively, the watermarked material may be transferred via an electronic communications network, possibly in compressed format.

Another aspect of the invention provides a method of watermarking and transferring watermarked material in a system comprising a transaction server and at least first and second clients, the method comprising the steps of:

Using the first client to (i) create a watermark, defined by (a) an invertible algorithm and (b) at least one security key associated with the algorithm and (ii) provide a material identifier;

using the said first client to associate the material identifier with the material an apply the watermark to the material;

and storing, in the transaction server, the said material identifier and data for inverting the algorithm including the said at least one key;

transferring the watermarked material to the second client;

deriving the said material identifier associated with the material;

transferring the identifier from the second client to the transaction server;

subject to predetermined conditions being satisfied, transferring from the transaction server to the second client watermark removal data associated with the said material identifier, the removal data including at least one key and data defining an algorithm for removing the watermark in conjunction with the key; and using the second client to remove the watermark using the said removal data. In an embodiment the watermark is created by interaction of the first client with the server.

Other Aspects of the Invention are Specified in the Claims to which Attention is Invited.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

First Example

FIGS. 1 to 10

Figure 1:
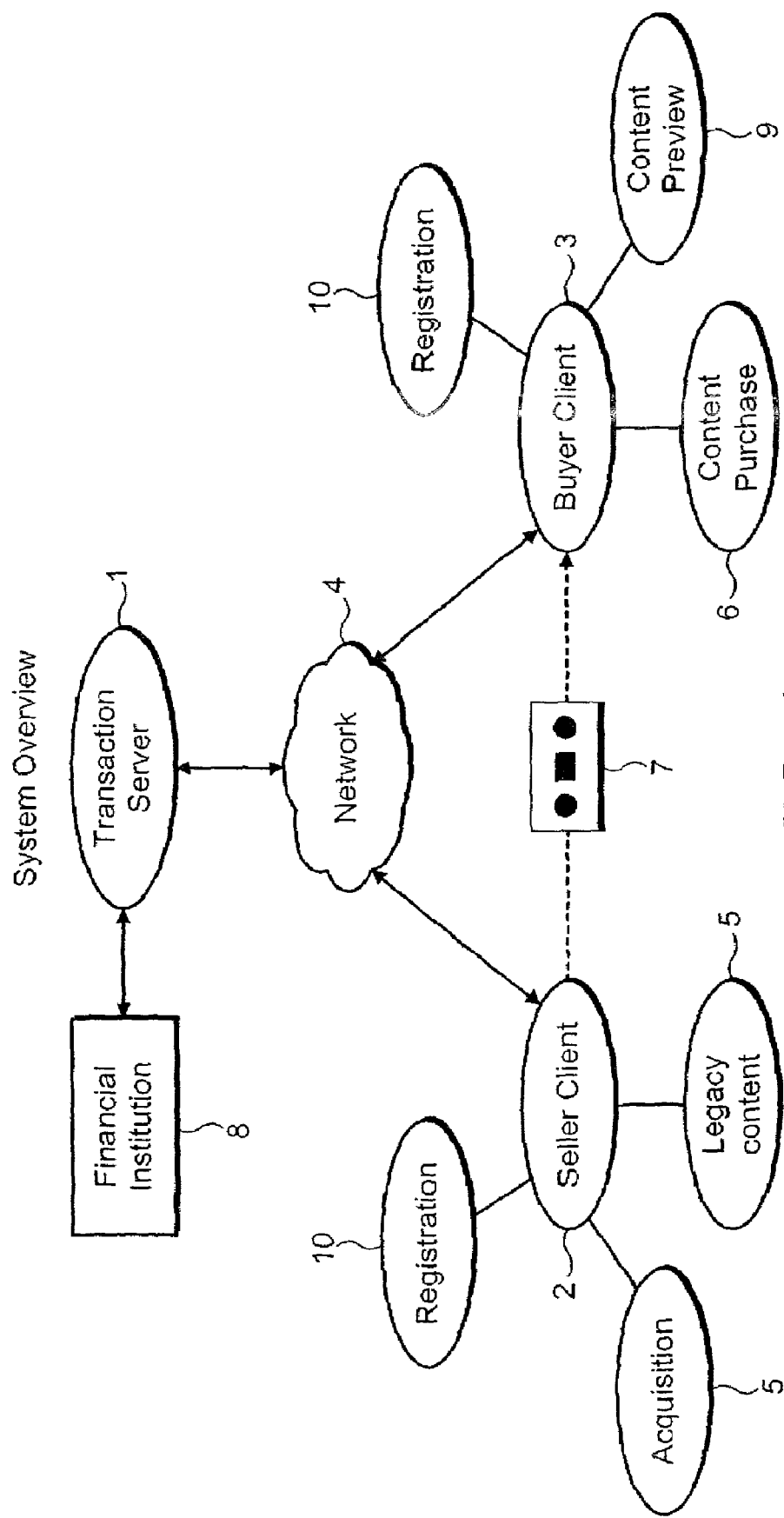
FIG. 1 is a schematic diagram of a material transfer system in accordance with a first example embodiment of the invention.

Overview, FIG. 1

Referring to FIG. 1, a first example of a system in accordance with the invention comprises a transaction server, a seller client 2, a buyer client 3 and a communications network 4 linking the clients to the server.

The owner of material, i.e. the seller, controls the seller client 2. A buyer controls the buyer client 3. A third party owns and controls the transaction processor 1. The system allows material to be acquired, securely and visibly watermarked, and transferred to the buyer for the buyer to preview (9) the watermarked material. If the buyer then wants to buy the material, the buyer obtains from the transaction server 1 the data needed to remove the watermark. In this example, the seller and buyer both register (10) with the transaction server. Registration, content preview, and watermark removal are described in more detail hereinbelow. The data for removal of the watermark is sent to the buyer only when the buyer has paid for the material. The payment is monitored by the transaction server 1 which communicates with a financial institution 8. Payment is made via the server 1 and/or via the institution 8.

Associated with the seller client 2 is a first apparatus 5 for compressing video material and for applying a watermark to the material as part of the compression process. An example of such apparatus and process are disclosed in copending British application 0029850.5, attorney fileP/10145, I-00-147 the content of which is incorporated herein by virtue of this reference to it. FIG. 1 denotes such apparatus at 5 by "legacy" and "acquisition" which will be described in more detail below in the sections "legacy" and "acquisition". Associated with the buyer client 3 is a second apparatus 6 for removing the watermark. An example of such apparatus and process are disclosed in copending British application 0029850.5, attorney fileP/10145, I-00-147 the content of which is incorporated herein by virtue of this reference to it. FIG. 1 denotes such apparatus at 6 by "content purchase" which will be described in more detail below in the section "content purchase".

In this example the material is video material and is recorded on a tape 7 which will be described in more detail with respect to FIG. 7. The material is acquired and watermarked by the first apparatus 5. In addition a material identifier is applied to the material. Then the material is transferred on the tape to the second apparatus 6. The transfer is for example by post.

An identifier is applied to the material. An example of an identifier is a Unique Material Identifier or UMID. UMIDs are described in more detail in SMPTE Journal March 2000.

Figure 2:
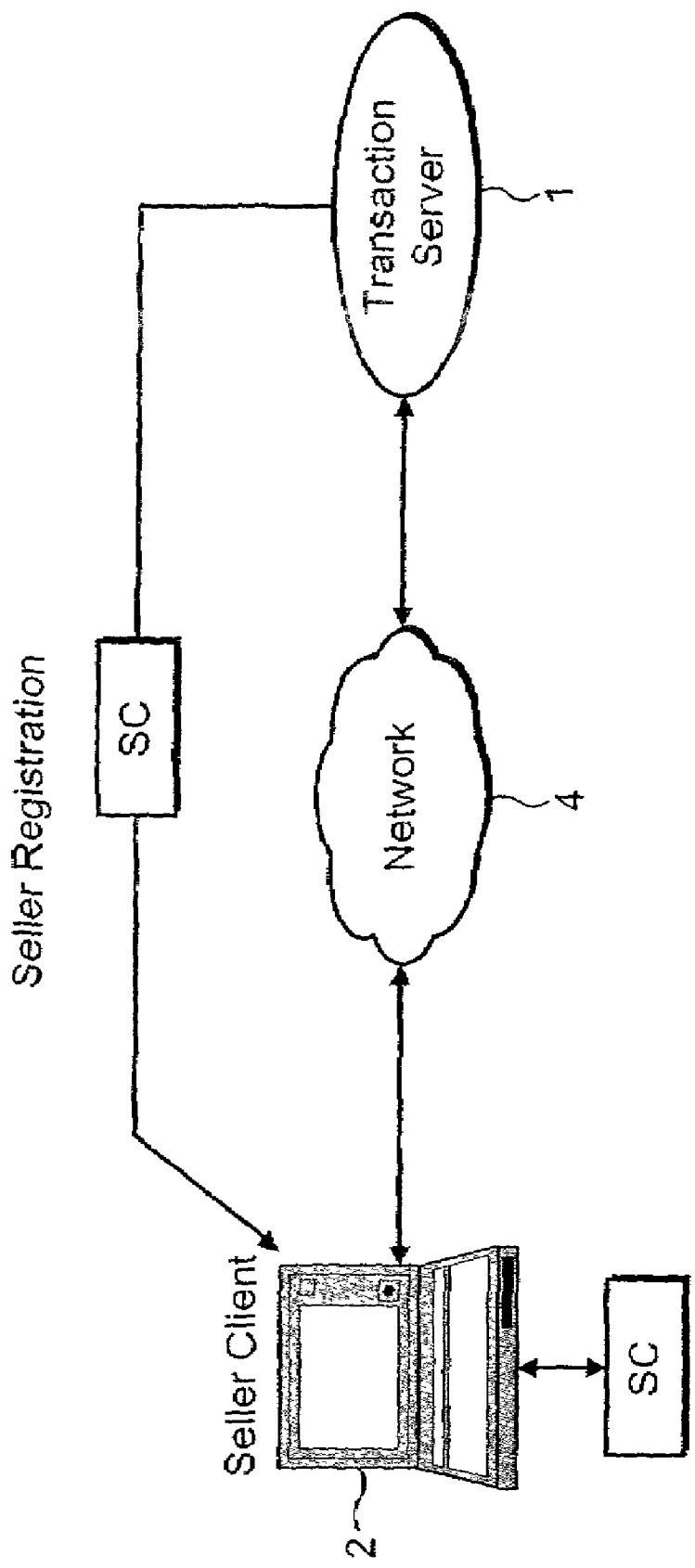
FIG. 2 is a schematic diagram illustrating seller registration.

Seller Registration FIG. 2

The seller client 2 is used to send to the transaction server 1 a) passwords, b) bank account details of the seller and c) any other information. The transaction server may then send a data carrier, in this example a smart card SC, to the seller. The seller inserts the smart card into the client 2 and communicates with the server 1. The seller designs the form of the watermark to be applied to the material using the server. The form of the watermark is defined by a bit map, also referred to herein as the template. The seller also obtains from the server an algorithm for creating the watermark including one or more security key generators for applying the watermark and a UMID generator. The seller may choose an algorithm from several available in the server. The template, algorithm, key generators and UMID generator are downloaded onto the smart card for transfer to the seller.

Figure 3:
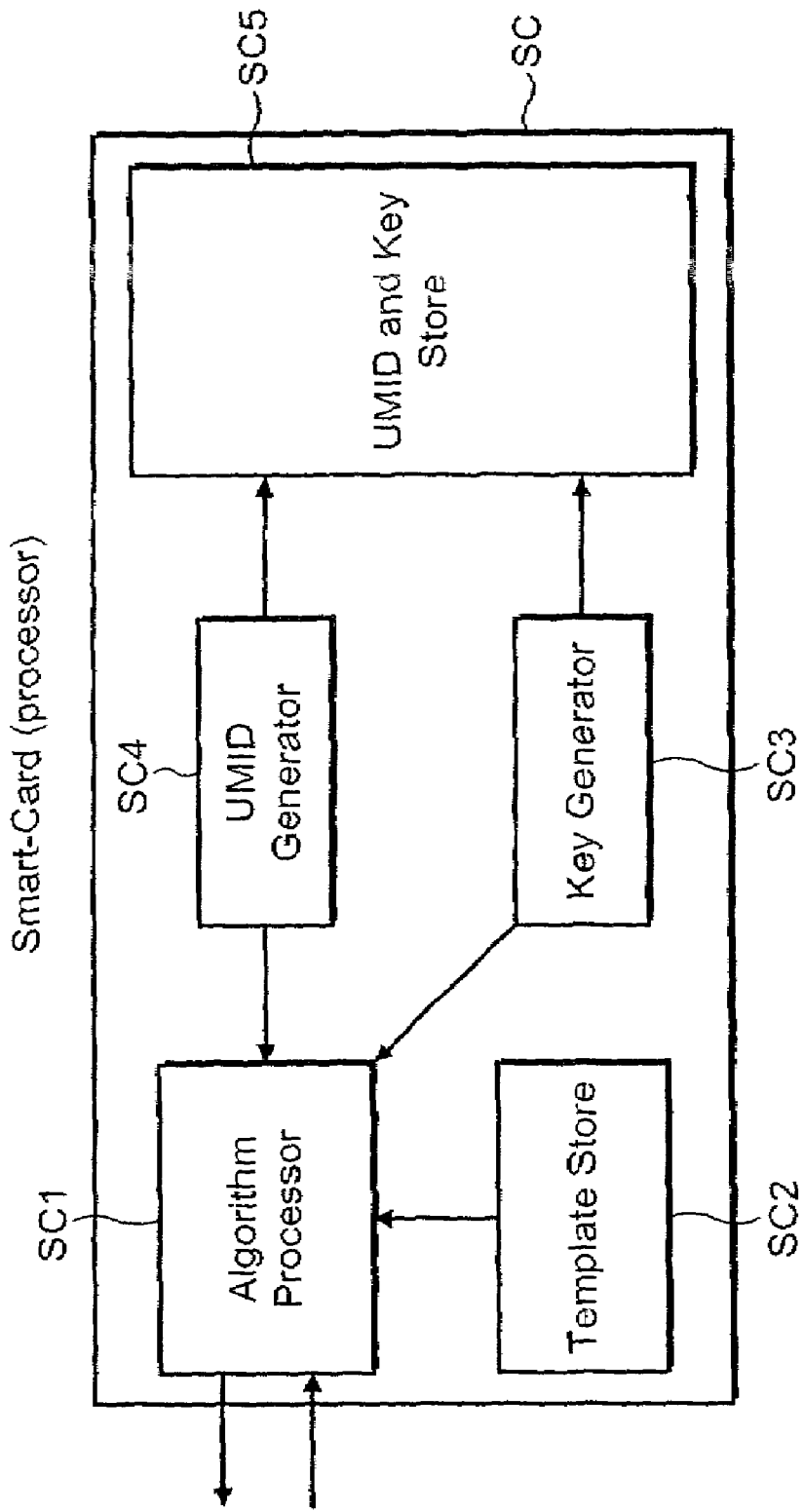
FIG. 3 is a schematic diagram of an example of a smart card.
Figure 4:
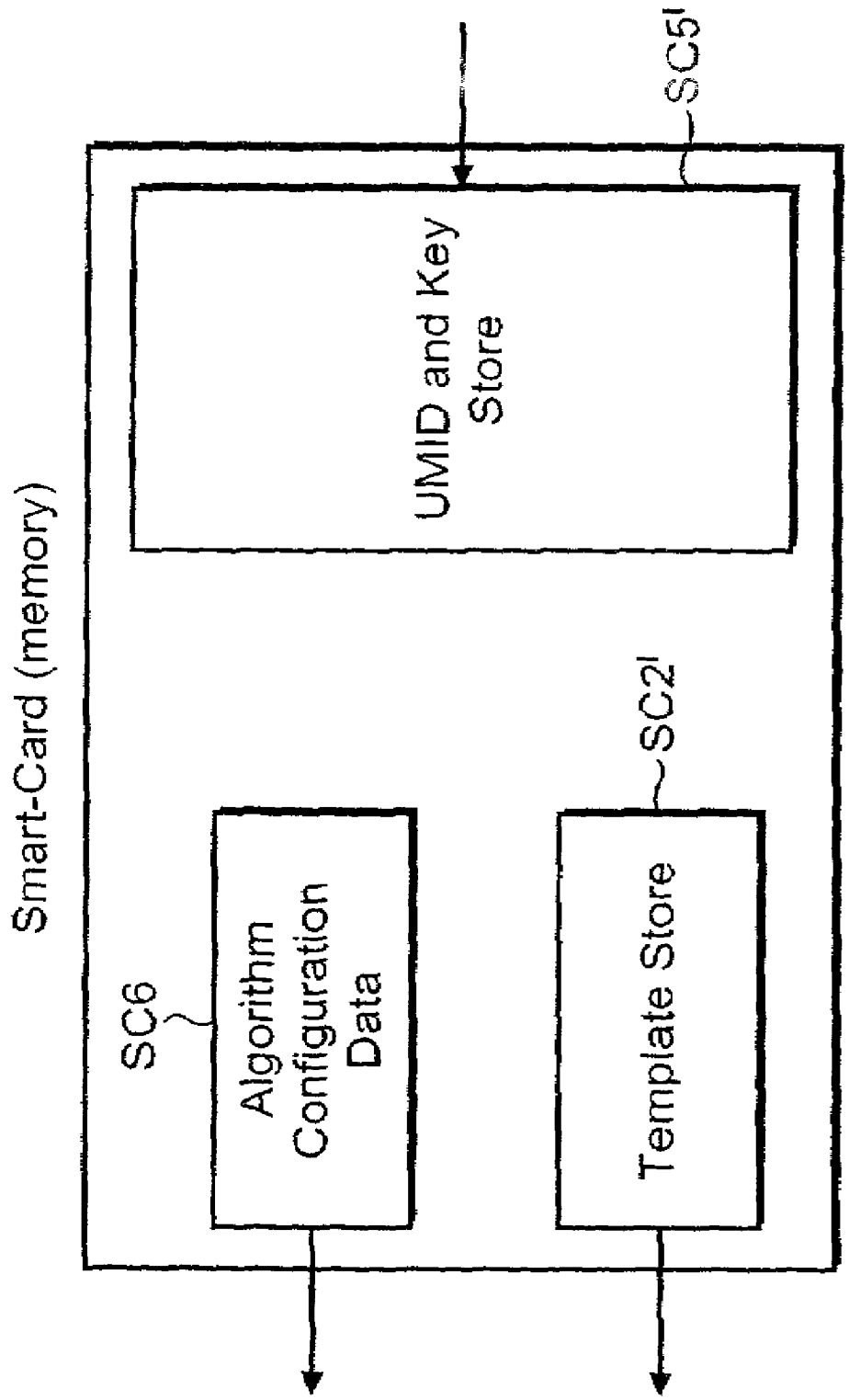
FIG. 4 is a schematic diagram of another example of a smart card.

Smart Card. FIGS. 3 and 4

Smart cards are well known. A smart card may have a processor and memory as shown in FIG. 3, or may have memory but no processor as shown in FIG. 4.

In the example of FIG. 3, the card SC has a processor SC1, a template store SC2, a key generator SC3, a UMID generator SC4 and a store SC5. The template store SC2 stores the template defining the form of the watermark. The processor is programmed to implement the algorithm. The processor SC1 receives a representation of the image to be watermarked and uses the keys generated by the generator SC3 and the template to apply the watermark. Keys generated by the generator SC3 are stored in the store SC5. Each piece of material is assigned a UMID. Each UMID is also stored in store SC5 in association with the keys generated for that piece of material. The representation of the image may be a spatial domain image or a transform of the image used for compression of the image.

In preferred embodiments, the smart card of FIG. 3 cooperates with an external processor which for example produces transform coefficients as part of a compression process and the processor SC1 applies the watermarking algorithm to the coefficents.

In the example of FIG. 4, the smart card contains only memories SC5', SC2' and SC6. SC5' is a UMID and key store, SC2' is a template store and SC6 stores algorithm configuration data. The card of FIG. 4 operates in conjunction with an external processor to apply a watermark to material. UMIDs and keys generated in that process are stored in the store SC5'.

Figure 5:
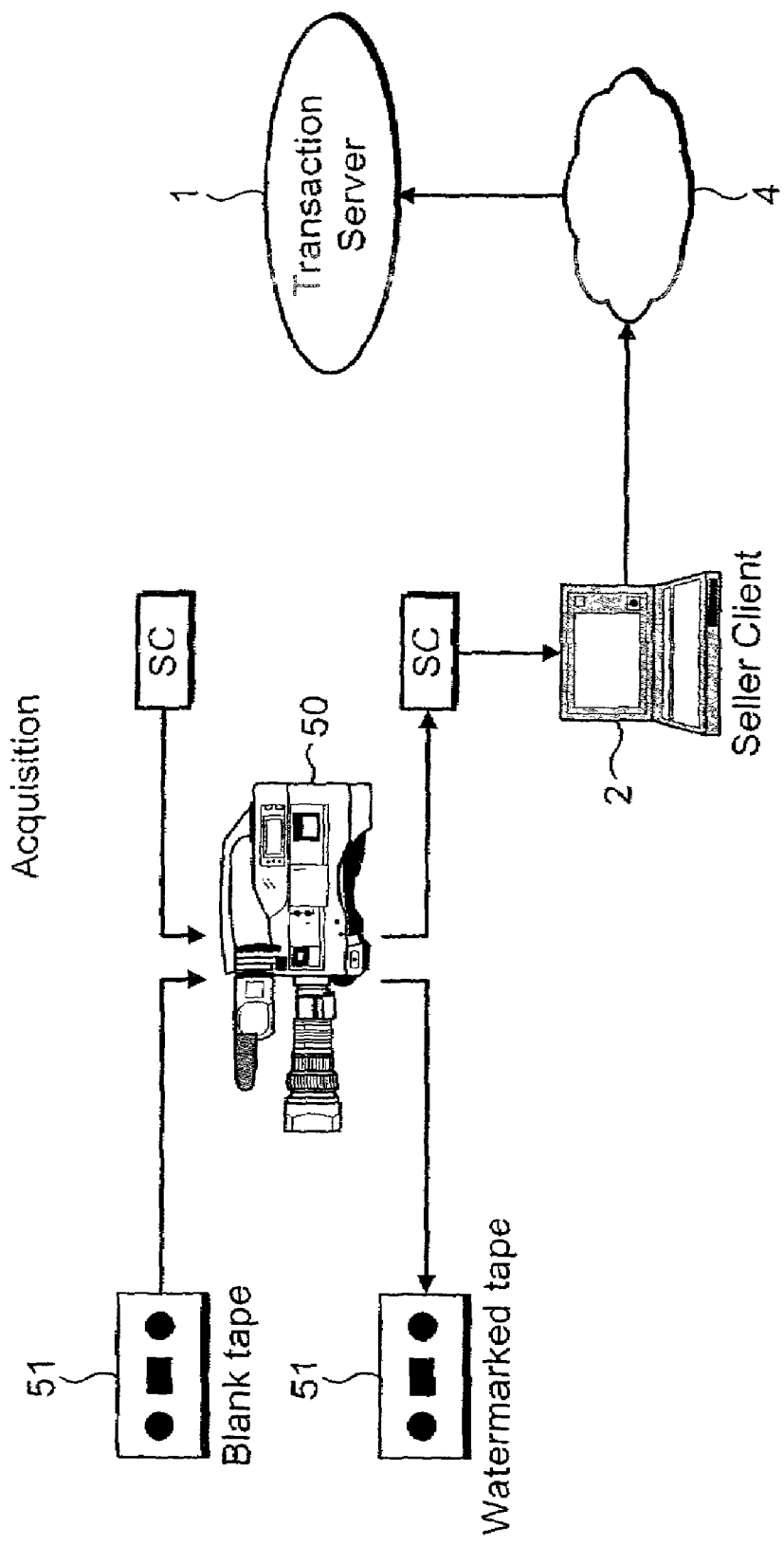
FIG. 5 is schematic diagram illustrating material acquisition.

Acquisition, FIG. 5.

Referring to FIG. 5, new material is acquired using a camera 50. A blank tape 51 is inserted into the camera 50. Also a smart card SC is inserted into an interface in the camera. This example assumes that the card is as shown in FIG. 3 and has a processor SC1. The camera 50 produces image data (which may be DCT coefficients) which are applied to the processor in the card SC. The card applies the watermark defined by the stored template and the algorithm and keys. The card also generates one or more UMIDs to identify the material recorded on the tape. The UMIDs and keys so generated are stored in store SC5 on the card. The UMIDs are also recorded on the tape (see FIG. 7 below).

The card SC is removed from the camera 50 and inserted into the seller client 2. The data stored on the card is transferred to the server 1 via the network 4. In addition the seller may record on the smart card and transfer to the server 1 data such as price, and conditions of sale. In addition metadata relating to the material may be transferred. The UMIDs provide references which uniquely identify the material and the data associated with it which are transferred to the server 1.

Figure 6:
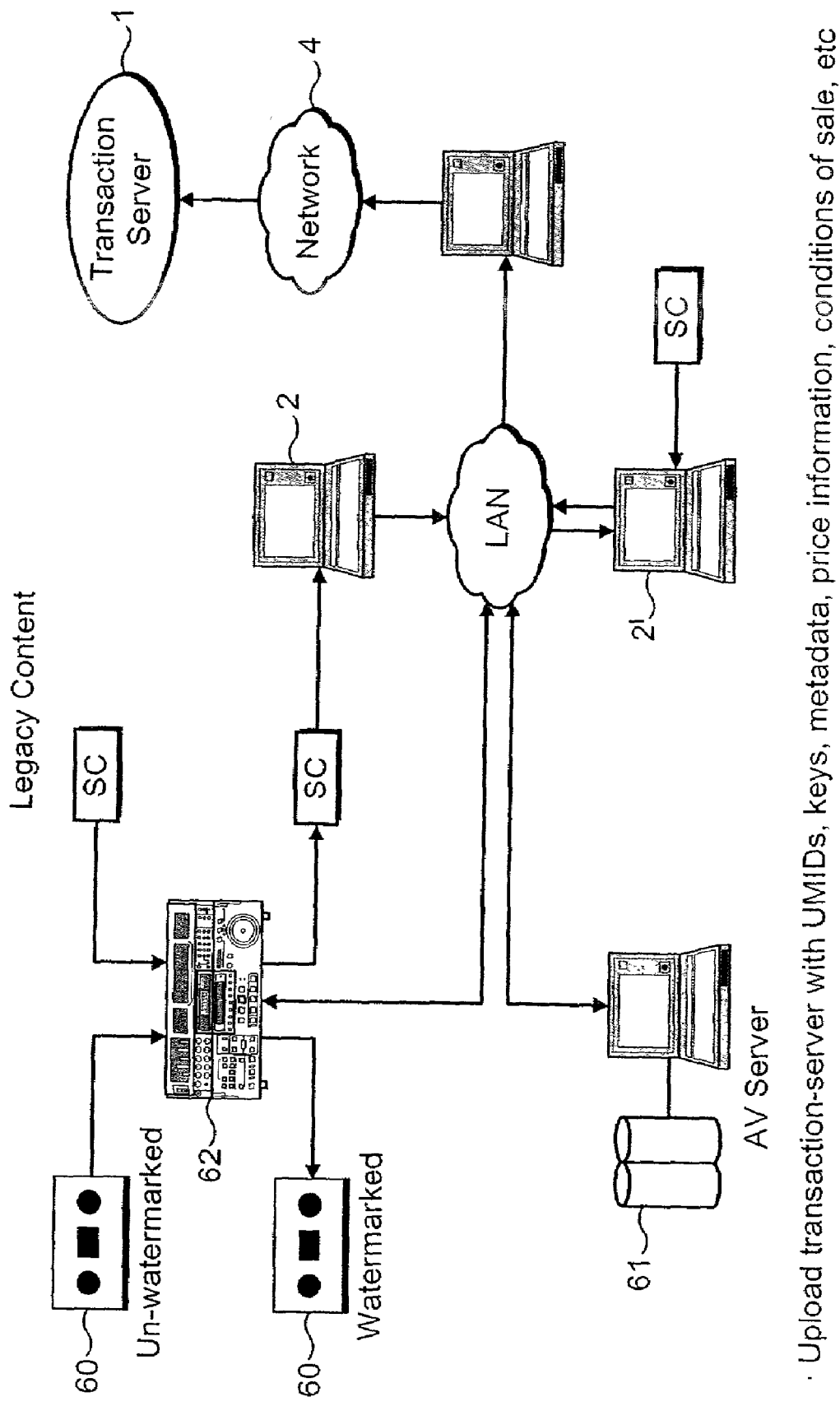
FIG. 6 is a schematic diagram illustrating the application of the invention to legacy material.

Legacy Material, FIG. 6

Legacy material is "old" material which did not have a watermark applied according to the present invention when first acquired. Such legacy material may be stored on tape or in other storage 61, for example an A/V server 61. In the system of FIG. 6, a VTR 62 has an interface for receiving a smart card SC and also a port for receiving material from the A/V server 61. Also an unwatermarked tape 60 containing legacy material may be inserted into the VTR 62. The VTR operating with the smart card SC applies a watermark and UMID to the legacy material and the generated keys and UMIDs are stored in the card SC as described above. The card SC is inserted into the seller client 2 for transfer, via network 4, of its data, plus any other data such a price and conditions of sale, as described above in relation to acquisition to the transaction server 1.

FIG. 6 shows the VTR 62 and seller client as part of a Local Area Network having at least one workstation 2, 2'. That work station has an interface for receiving a smart card. Legacy material from the A/V store 61 may be routed to the workstation 2' which co-operates with the smart card to apply a watermark to the material which is then stored in the store 61. The UMIDs and keys generated during the process of watermarking are stored on the card SC. The workstation 2' may retrieve the data stored on the card and send it to the server 1.

Watermarked material may be stored on the ANV server 61 and also on tape 60.

Tape. FIG. 7

Figure 7:
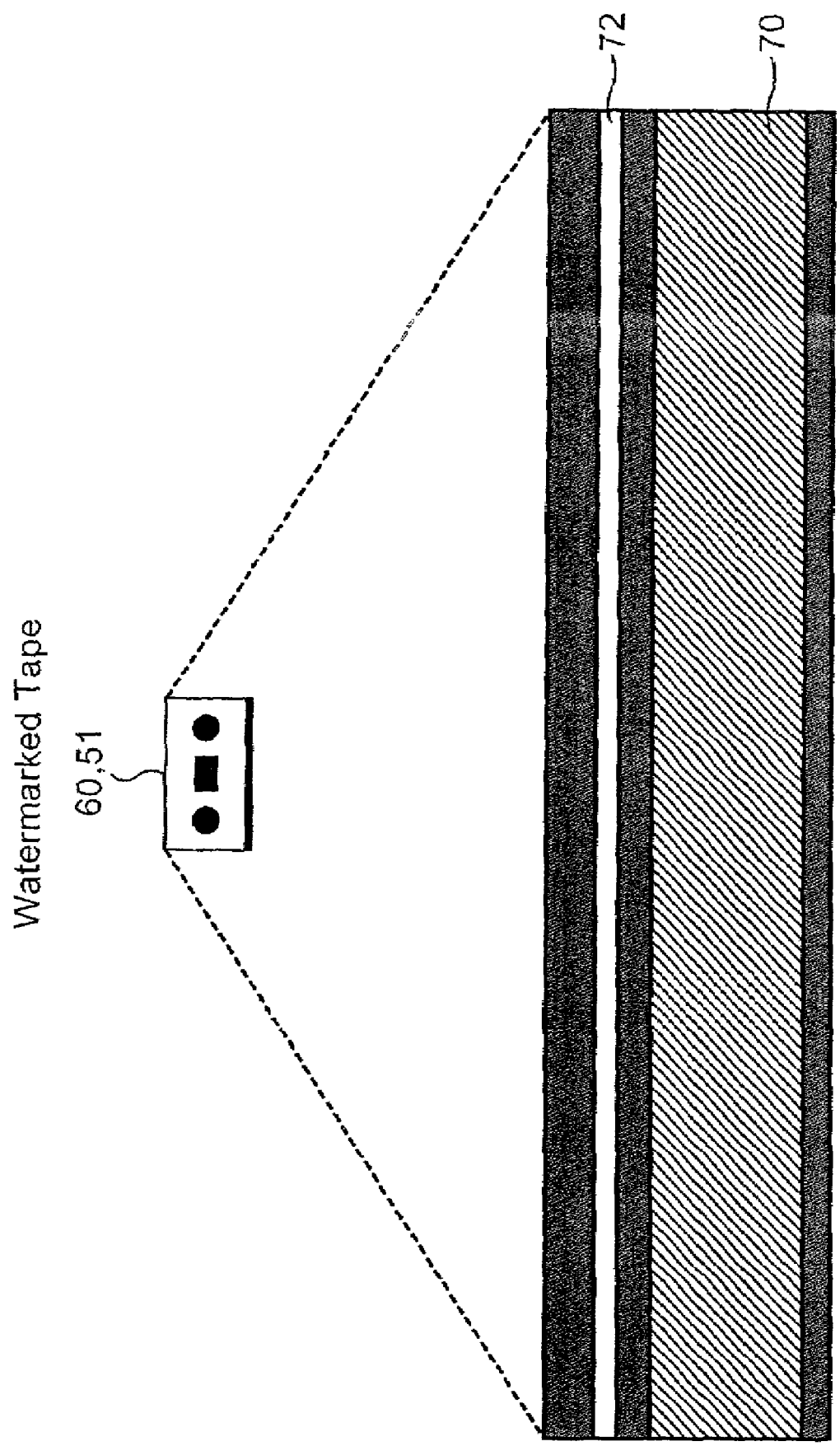
FIG. 7 is a schematic diagram of a tape on which a material identifier and watermarked material is recorded.

Referring to FIG. 7, an example of a tape 51 or 60 is shown. Watermarked Video is stored in conventional manner in helical tracks 70. The tape has a conventional control track 72 in which time codes are recorded. The UMIDs are recorded in the user bits of the time codes. That is described in more detail in copending British application 9926321.3, (also EP 00309067.7), attorney file P/7211, I-99-41.

Figure 8:
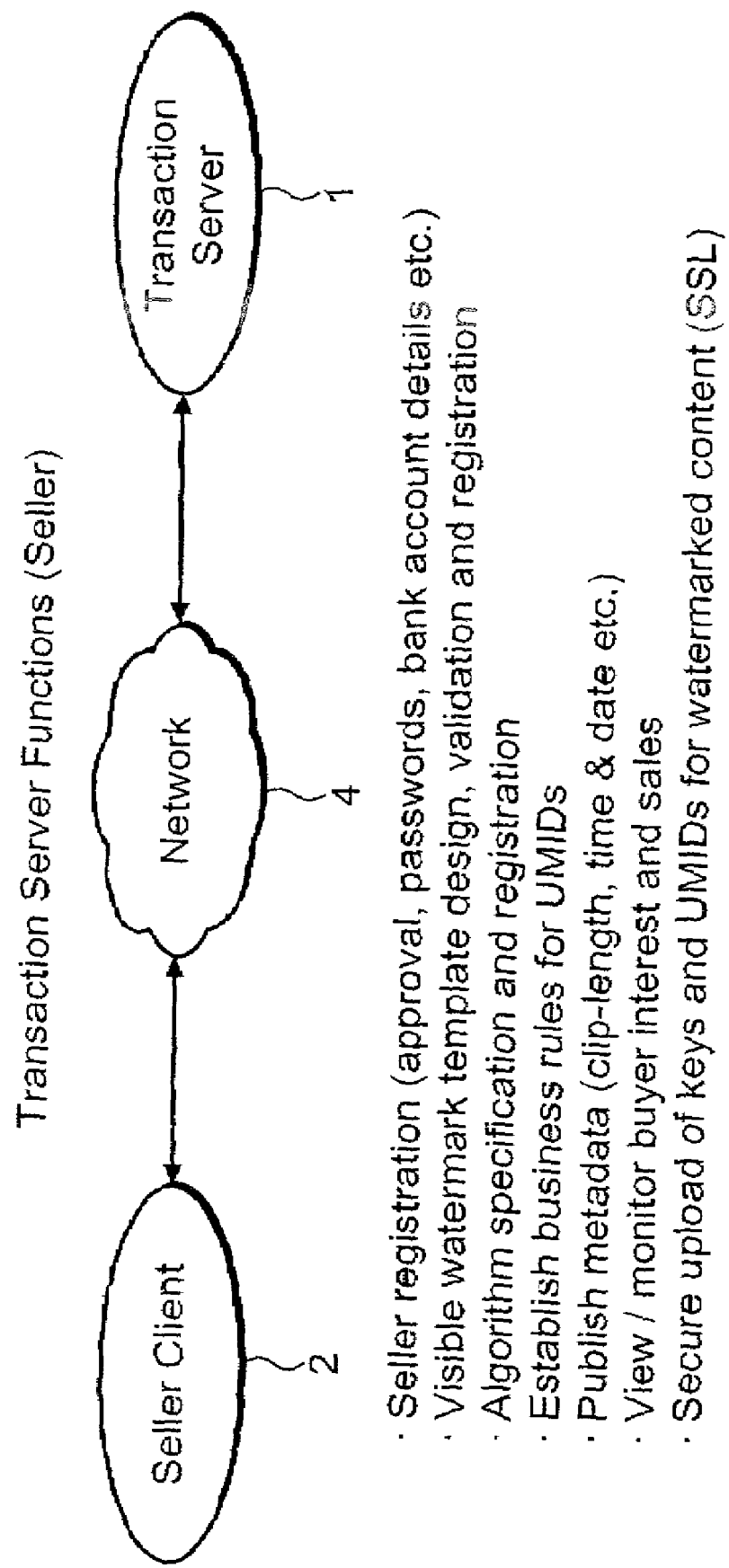
FIGS. 8 and 9 illustrate transaction server functions.

Transaction Server. FIG. 8

The transaction server 1 provides secure communications with the seller and buyer clients. It also controls financial transactions by holding buyer and seller accounts. As described above, the seller registers passwords, bank account details with the server 1. In addition, the server provides algorithm specifications and registration, and provides a system for designing templates. It establishes rules for UMIDs. It also provides for the secure uploading and storage of keys and UMIDs generated during watermarking. Metadata may also be uploaded and stored in the server 1. The UMIDs provide references for associating the stored data with the material to which that data relates. The transaction server may provide to potential buyers access to the metadata. The access may be free of cost or subject to payment or a combination of both. The metadata may include clip lengths, time and data information amongst many other possibilities.

The transaction server may store multiple different algorithms for creating and removing watermarks, in addition to the currently preferred and inventive algorithm which is described in copending British application I-00-147, P/10145, Application 0029850.5.

The transaction processor also monitors buyer interest and sales and controls the release of data for removing watermarks; such data is not released unless the server has confirmation that the buyer satisfies the conditions of sale including paying for the material.

The transaction server 1 also controls the distribution of smart cards.

Figure 9:
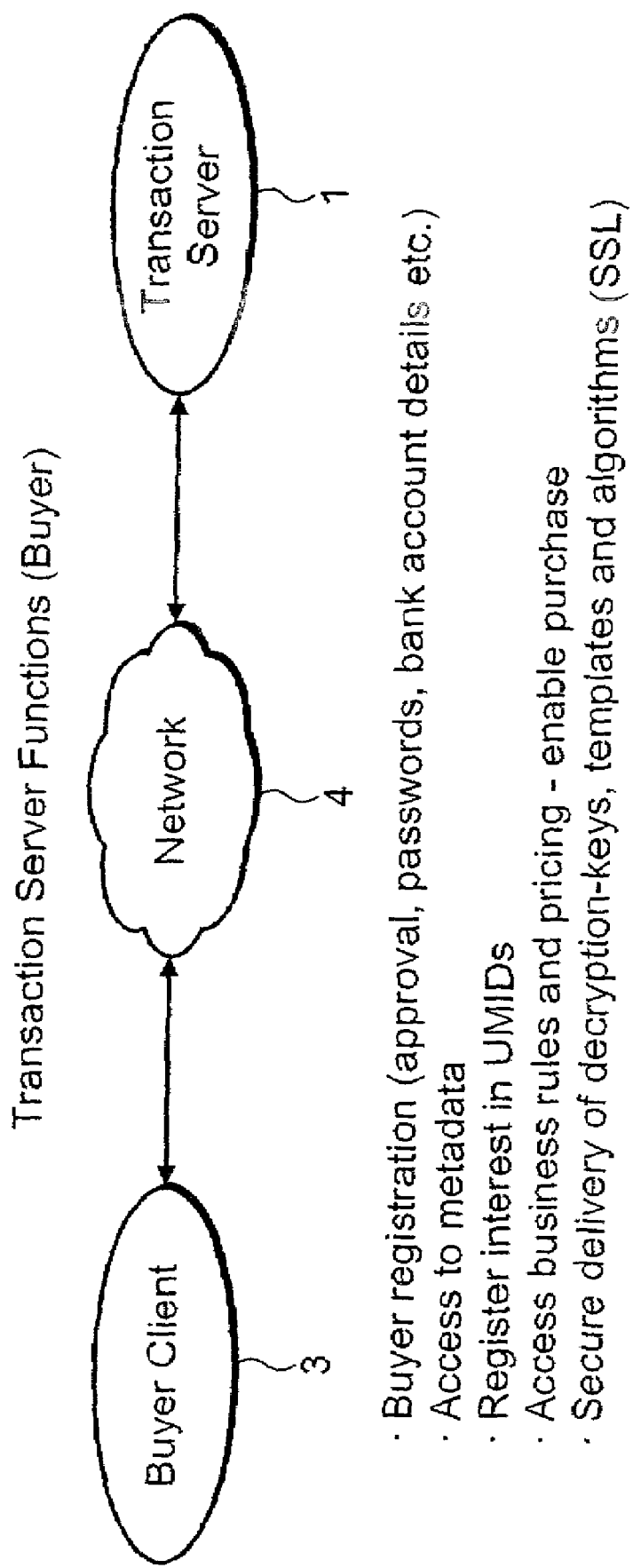

Transaction Server, FIG. 9

The transaction server also provides for the registration of data relating to the buyers. For example, the buyer provides details of bank accounts, passwords and any other data relevant to a transaction.

The registration of the buyer allows access to:
a) business rules, prices and conditions of sale to enable the buyer to purchase the material; and
b) data, such as metadata, relating to material received by the buyer and which the buyer has bought or which he might buy.

Once the buyer has satisfied the conditions of sale, the transaction server provides secure delivery of decryption keys, templates and algorithms for removing watermarks. That may be done by securely downloading data to smart cards as described above and sending the smart cards to the buyers.

Figure 10:
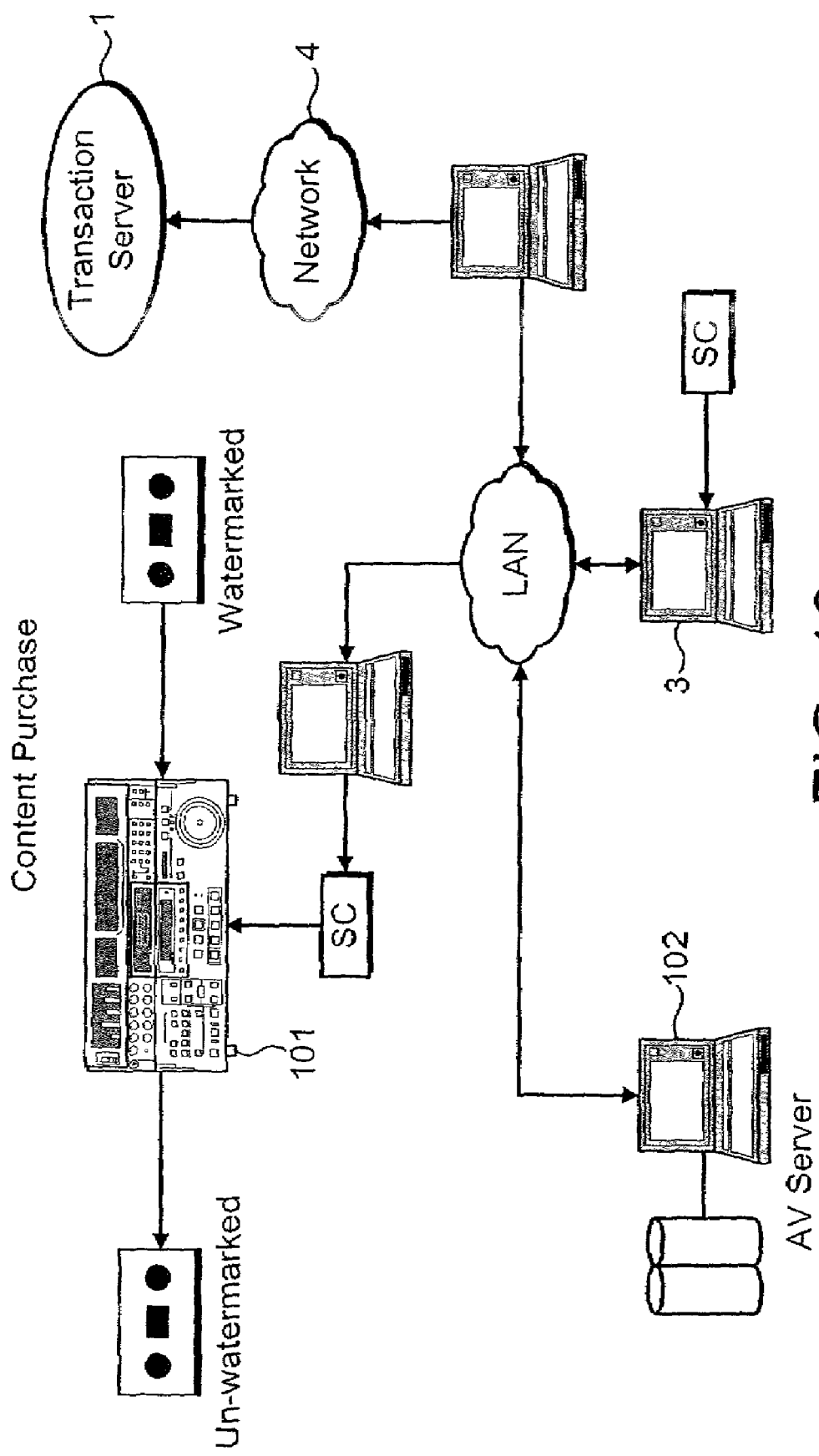
FIG. 10 is schematic diagram illustrating material purchase.

Content Purchase, FIG. 10

Referring to FIG. 10, a buyer receives watermarked material and previews it on a VTR 101. If the buyer is interested in the material, he accesses the UMID recorded on the tape and registers his interest in the material with the transaction server using the UMID as a reference via the buyer client 3 and the network 4. The transaction server provides to the buyer the conditions of sale and price. If the buyer then agrees to buy, the buyer provides payment and requests the data needed to remove the watermark.

Payment may be by automatic transfer from his bank account previously registered with the server 1 or by other means which the server can monitor. Once the server 1 has confirmation of payment, the server 1 provides the watermark removal data. That data is downloaded via the buyer client 3 to a smart card SC as described above for example. The smart card is inserted into an interface in the VTR 101 which then co-operates with the card to remove the watermark. In this example the card is assumed to be a card as shown in FIG. 3.

Instead of receiving watermarked material on tape or other recording medium, the watermarked material may be accessed from an A/V store 102.

The embodiments of the invention have been described with reference to video material. However the invention is also applicable to audio/visual material, to audio material and to other data material.

Whilst the foregoing refers to transferring material on tape via a physical communications network such as the Post, the material could be transferred via an electronic network, most preferably a broad-band network.

The network 4 may be the web as shown in the figures. It could be any other communication network.

Transfer of data between the server and the clients is preferably carried out in a secure manner using security techniques known in the art of secure communications.

Modifications

The examples of the invention described above use a smart card for transferring data. The data may be transferred on other data carriers. Smart cards are advantageous because they provide security for the data. Data may be carried on other carriers preferably in encrypted form for security. Most preferably, the data carrier is hand insertable into an interface.

The transaction server contains metadata relating to the watermarked material. That metadata preferably includes samples and/or extracts of the watermarked material to allow potential buyers to browse the material available. For example for video, low resolution frames and/or video sequences may be browsed. The metadata also may include text describing the material which may be searched and which is also preferably linked to the samples of the material. Thus, for example a video sequence of a well known person may be accessed by searching for his or her name. Once found the buyer can request that the tape of the watermarked video be transferred to him.

The examples of the invention described above refer to video material. The invention may be applied to moving and still images. The invention may be applied to audio material or to data material. Preferably it is applicable to audio/visual material.

Second Example: Client-server System

Figures 11 to 15

Overview

Figure 11:
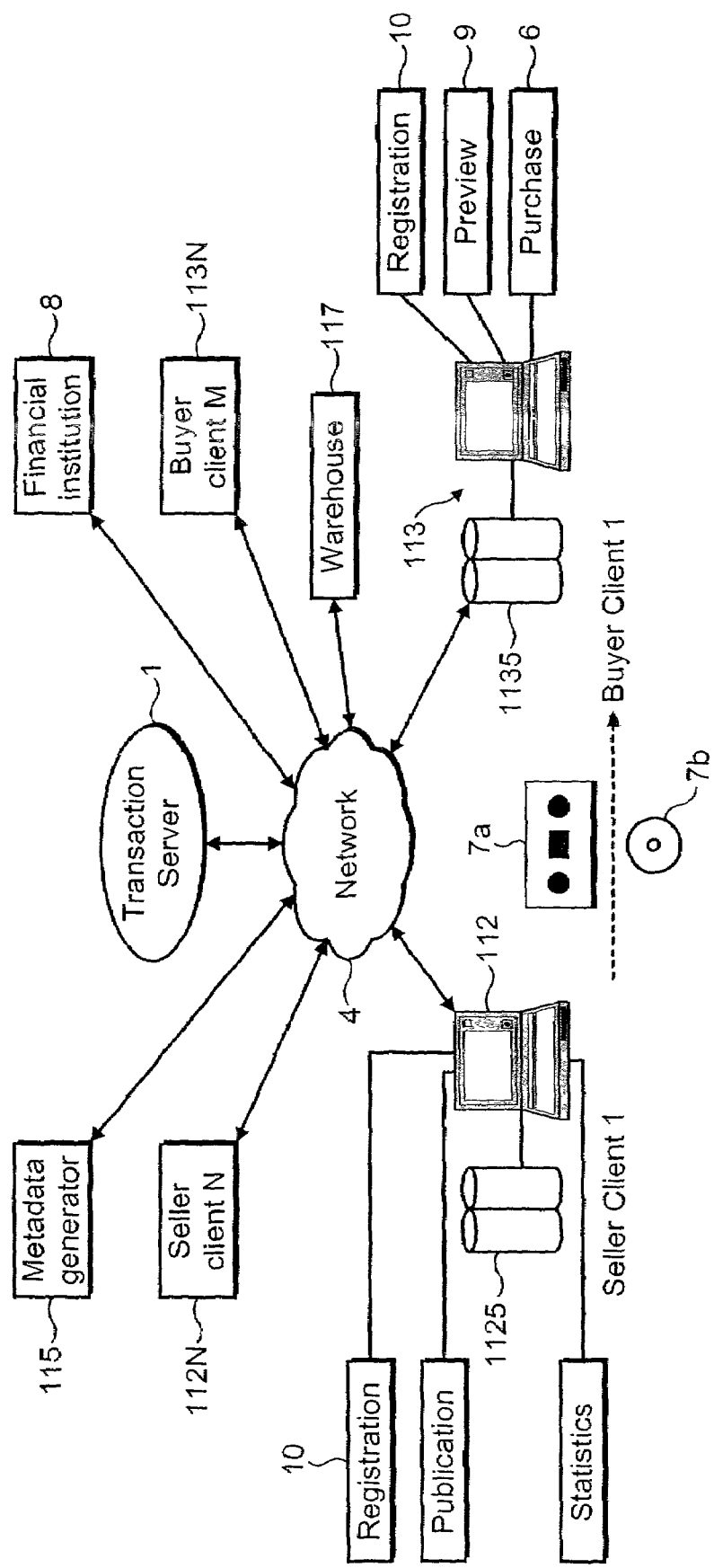
FIG. 11 a schematic diagram of a material transfer system in accordance with a second example embodiment of the invention.

Referring to FIG. 11, a second example of a system in accordance with the invention comprises a transaction server 1, one or more seller clients 112, 112N, one or more buyer clients 113, 113N and a communications network 4 linking the clients to the server.

The owner of material, i.e. a seller, controls a seller client 112. A buyer controls a buyer client 113. A third party owns and controls the transaction server 1. The system allows material to be acquired, securely and visibly watermarked, and transferred to the buyer for the buyer to preview (9) the watermarked material. If the buyer then wants to buy the material, the buyer obtains the data needed to remove the watermark. In this example, the seller and buyer both register (10) with the transaction server. Registration, content preview, and watermark removal are described in more detail hereinbelow. The data for removal of the watermark is sent to the buyer only when the buyer has paid for the material. The payment is monitored by the transaction server 1 which communicates with a financial institution 8. Payment is made via the server 1 and/or via the institution 8.

Figure 12:
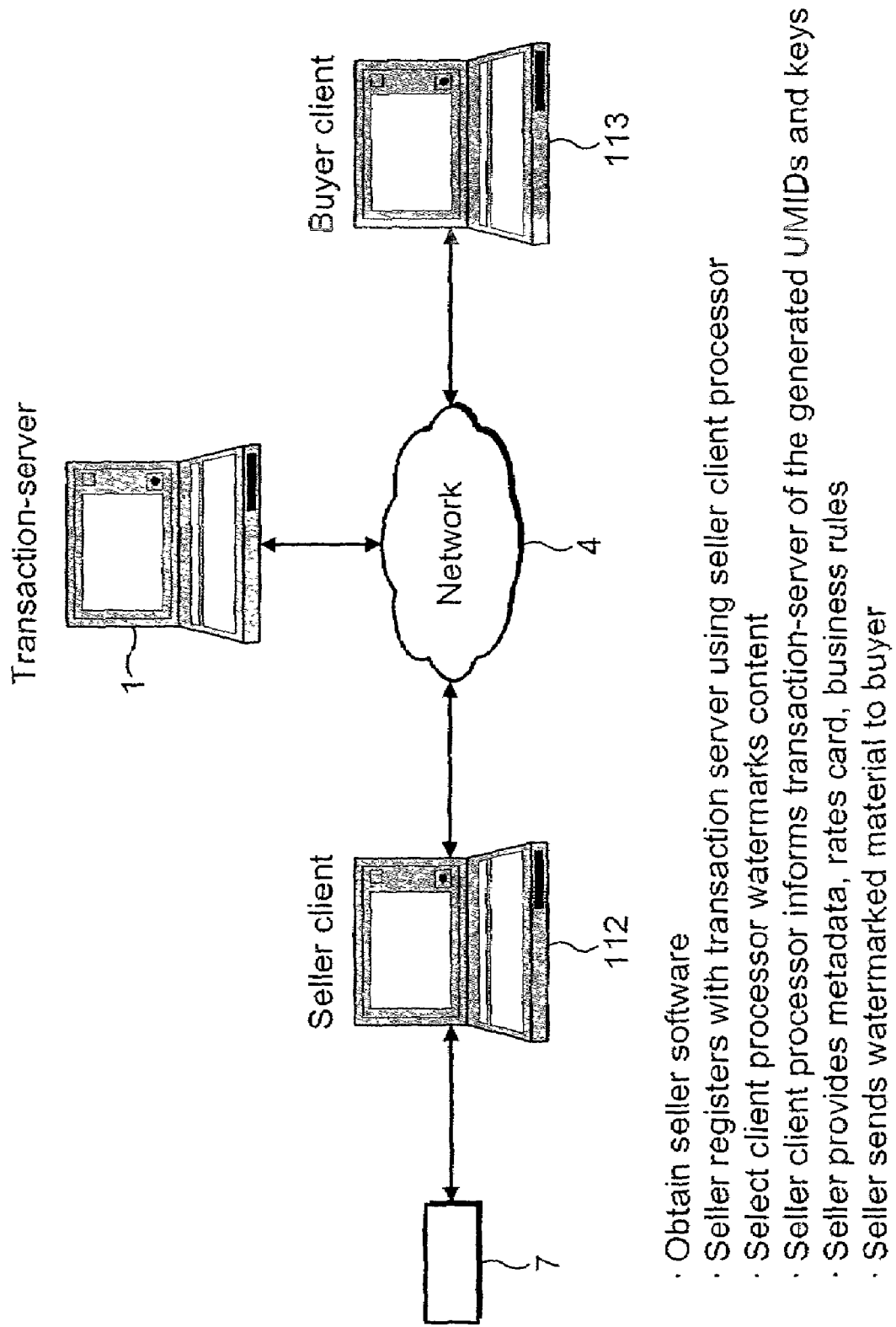
FIG. 12 is a schematic diagram illustrating seller registration in a second example embodiment of the invention.

The system of FIG. 12 may be operated in two modes. In one mode, termed the "push mode" the seller sends tapes or other storage media to many potential buyers. The contents of the tapes are perceptibly watermarked allowing the potential buyers to view the content but the content is protected against misuse by the perceptible watermark. If a buyer decides to purchase, then he is sent removal data needed to remove the watermark.

In another mode, termed the "pull mode", potential buyers use metadata relating to the content stored on the transaction server to find content they are interested in and then request the seller to send them watermarked content for preview. If a buyer decides to purchase, then he is sent removal data needed to remove the watermark.

Referring to FIG. 12, the seller obtains seller software, and registers with the transaction server. The seller client processor watermarks the material generating watermark removal data. The seller client processor informs the transaction server of watermark removal data and of identifiers associated with the material. The seller uses the client processor to provide metadata, rates card and business rules to the transaction server. The seller sends watermarked material to potential buyers. These steps will now be described in more detail.

Seller Registration-FIG. 12

Someone who wishes to be a seller firstly acquires seller software. This may be done in any conventional manner: for example by downloading it from the server 1, or by acquiring a stand alone software package. The seller registers with the server 1, providing to the transaction server 1 a) passwords, b) bank account details of the seller and c) any other information.

Apply Watermark

The seller then needs to apply visible watermarks to the material he/she wishes to make available to buyers. In this example assume the material is a video sequence. The seller loads the material into the seller client to apply the watermark. The seller client is used to design and apply the watermark The seller client downloads from the transaction server watermark design software The seller uses the software off-line to design the form of the watermark and chooses parameters such as the perceptibility of the watermark as described hereinbelow. This results in watermark configuration data and removal data. The removal data is downloaded to the transaction server 1 and/or to a smart card as described above. The watermark configuration data is sent to a watermarking processor which in the preferred embodiment is in the seller client. The watermarked video may be stored on a storage medium 7 for example a tape, disc or solid state store. In this example the medium is a tape as shown in FIG. 7.

The watermark is applied using an invertible algorithm which uses pseudo random numbers generated from one or more keys and one or more templates. An example of a suitable method of generating such a visible watermark is disclosed in copending UK applications 0029850.5, attorney file P/10145,I-00-147 and 0121197.8, P/10145GBP, I-00-147A the contents of which are incorporated herein by reference.

The seller may choose the level of the watermark, that is the perceptibility of the watermark. Thus a seller may mark particularly valuable material more heavily than other less valuable material. The area of a video frame covered by a watermark may be chosen. The watermark may vary with time through the material. Ways of doing that are disclosed in UK applications 0121197.8, attorney file P/10145GBP, I-00-147A.

Apply Identifier

An identifier is applied to the material. An example of an identifier is a Unique Material Identifier or UMID. UMIDs are described in more detail in SMPTE Journal March 2000. The UMID is generated in the seller client 112. One or more UMIDs may be applied to a video sequence. A UMID uniquely identifies the video sequence to which it applies. The UMID may be applied as an invisible watermark and/or may be stored on the storage medium 7 with the video as shown in FIG. 7. Alternatively, the UMID may be attached to, or otherwise associated with, the storage medium.

The seller client processor 112 informs the transaction server 1 of the algorithm, key(s), template(s), used to generate the watermark and of the UMID(s) applied to the video sequence.

The seller also provides, to the transaction server 1, metadata, rates card data, business rules data and data for a license file. This data is provided by interacting with the transaction server and will be described with reference to FIG. 14.

Metadata-FIG. 14A

In this example the seller provides: a) some metadata (free metadata) which is useable by buyers free of charge, mainly so potential buyers can browse material which is for sale; and b) other metadata which is available only if paid for. The metadata includes identifiers, preferably the UMID(s), which are required to associate the metadata with the material. Metadata may be generated at the seller client 112 and/or by a separate generator (115 in FIG. 11). The generator 115 may be provided by an independent organisation who specialises in generating metadata.

The free metadata comprises metadata which allows buyers to find material which interests them and to determine whether they wish to preview it in more detail. Thus for an image or a video sequence the free metadata may comprise one or more small picture stamps, and keywords which allow buyers to search for material by descriptive words. The free metadata may also include for example the resolution of the image and other data.

Other free metadata, which may be invisible to the buyer, may include the IP (Internet Protocol) or other address of the seller client. The UMID(s) may be invisible to the buyer.

The metadata for which the buyer must pay may include for example data such as the script of a video sequence and other artistically creative data which may be intellectual property which is not owned by the owner of the video sequence. It may include metadata generated by the independent organisation and for which the seller wishes to recoup the cost of generation.

Rates Card-FIG. 14B

The rates card is a list of the prices at which the seller is willing to sell material the seller is offering. The rates card is preferably not accessible to buyers. Preferably the buyer is given only a final price for the use he wishes to make of the material. That price is determined on the basis of the rates card and the buyers responses to questions about his/her intended use.

The rates card may set a single price, or a set of prices for different conditions of sale.: A single rates card may be set up for all, or groups of, material offered by a seller. Alternatively, separate rates cards may be provided for respective items of material which cards are referenced to the material by the material identifiers, e.g. UMIDs.

By way of example a rates card for a video sequence may set

A base price of cost per second of video and adjustments of that base price for:
outright sale,
use once on broadcast television,
multiple use on broadcast television,
for duplication and distribution on video tape or disc,
Price variation dependent on the resolution of the video which is to be distributed, and/or
some uses or some multiple uses or repeat business.

The rates card may set any other organisation of prices.

The rates card may provide a seller with a predetermined set of prices which may be based on the experience of the operator of the transaction server in the market the operator serves. However, preferably the transaction server allows the seller to set up their own pricing.

Business Rules-FIG. 14C

The server 1 may store one or more predetermined, standard contracts and/or may provide a seller with the facility to set their own customised terms of contract. The contract once set by the seller is accessible by buyers.

Figure 13:
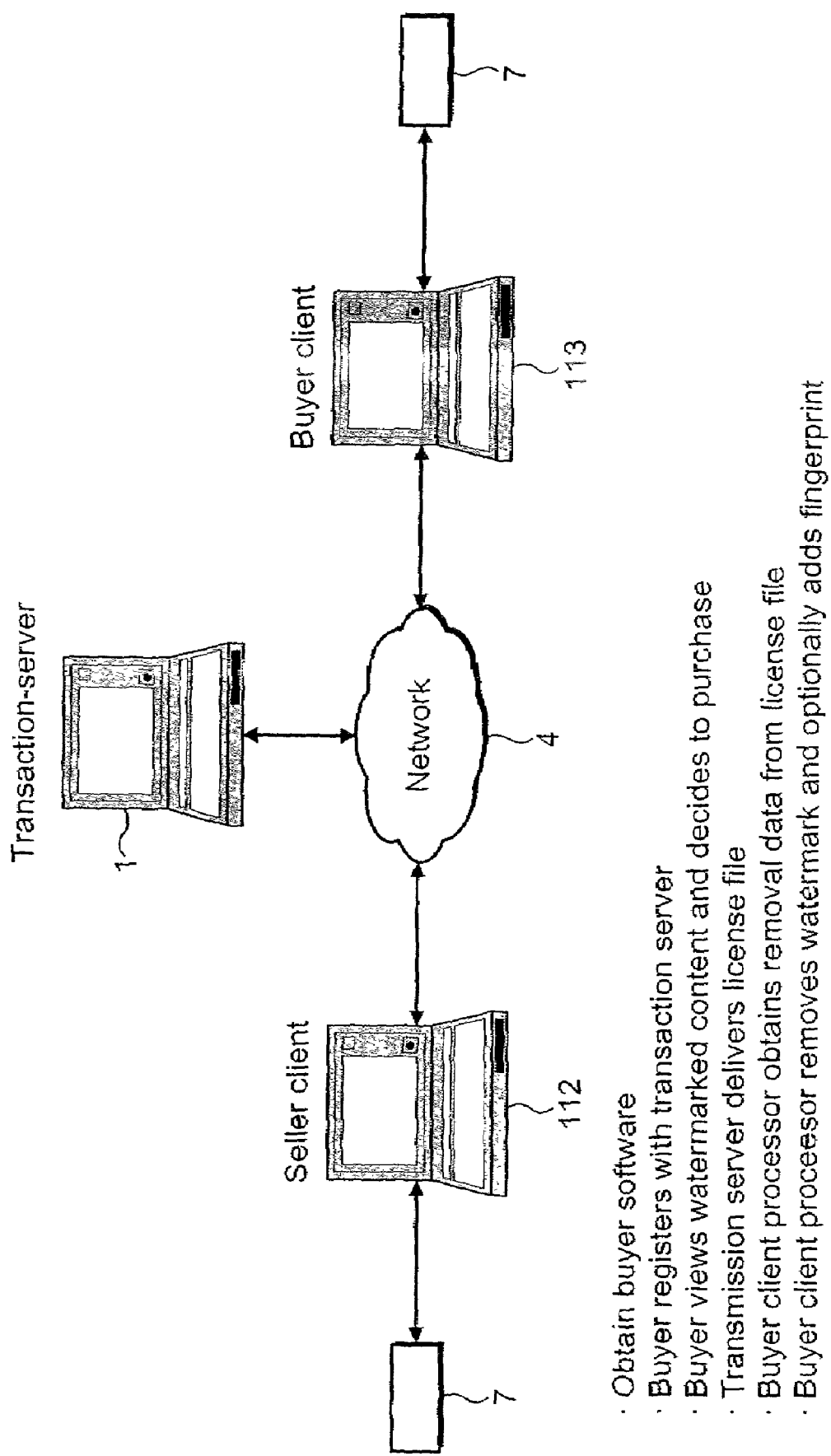
FIG. 13 is a schematic diagram illustrating buyer registration in the second example embodiment of the invention.

Buyer Registration-FIG. 13

Someone who wishes to be a buyer, firstly acquires buyer software. This may be done in any conventional manner: for example by downloading from the server 1, or by acquiring a stand alone software package. The buyer registers with the server 1, providing to the transaction server 1 a) passwords, b) bank account details of the buyer and c) any other information.

Buyer searches for video of interest-FIG. 13.

The buyer accesses the metadata stored on the transaction server to look for video which interests him using for example key words. The buyer also accesses for example picture stamps. If the buyer finds video which may interest him he then expresses an interest in the video sequence. The transaction server 1 informs the seller client 112 and a visibly watermarked copy is sent to the buyer. In a currently preferred example, the copy is sent to the buyer on the storage medium, e.g. a tape 7 by post or courier. However it could be sent in other ways; for example electronically via the network 4 especially if the network supports 'broad-band' transmission of video. The transaction server 1 may automatically send an e-mail to the seller client to inform the seller of the buyers interest and to prompt them to send the video to the buyer. Alternatively, the request could be processed by an automated warehouse (117 in FIG. 11) in response to an order from the server 1 or the client 112. The warehouse 117 would dispatch a storage medium 7 containing the desired video to the buyer.

The interest of the buyer is registered with a transaction log.

The following description assumes the buyer stores the video electronically in a storage medium associated with his client processor 113.

The Buyer Pays for the Video and Removes the Watermark

The buyer reviews the watermarked copy. If he wishes to buy it he indicates his interest. The buyer client 113 identifies the video from the identifier (UMID) associated therewith. The identifier is transmitted to the transaction server 1. The server then allows him to access the business rules and the rates card to determine the price and the conditions with which he must comply. The buyer may also buy additional metadata. He may pay electronically via the network 4. The payment and the identifier of the video is registered with the transaction log. A license file is generated and stored at the transaction server. The file contains the data set out with reference to FIG. 14D.

License file-FIG. 14D

Once payment has been acknowledged by the transaction server, the licence file is downloaded from the transaction server to the buyer client. The file contains the UMID(s), the free metadata, the bought metadata, the business rules, the price information, and the secret data for removing the watermark. The file may also include secret security data for adding a fingerprint to the material. The visible watermark is removed using the removal data in the license file and preferably an invisible fingerprint is added. The fingerprint uniquely identifies the buyer to help protect the video against unauthorised use. The fingerprint allows the owner of the material to trace misused video back the buyer.

The removal of the visible watermark and the addition of the fingerprint take place in the buyer client, which may be a PC, securely without interaction by the buyer. The software required to do that is protected by known digital rights management techniques against misuse.

Figures 14, 15:
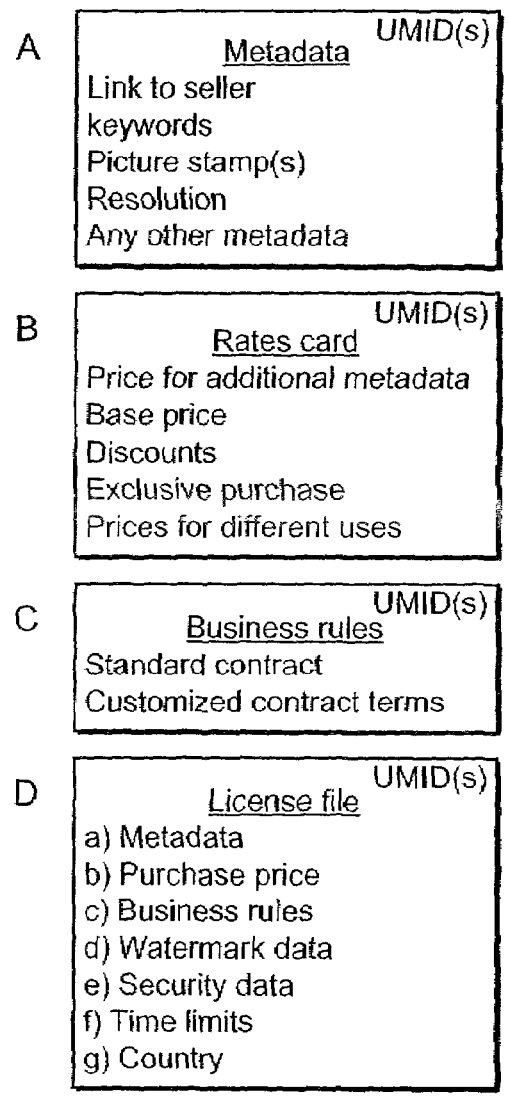
FIGS. 14 and 15 schematically illustrate files stored in a transaction processor of the system of FIG. 11.

Statistics and Transaction Log-FIG. 15

Referring to FIG. 15, the transaction server 1 preferably maintains a transaction log, which contains for each seller statistical data useful to the sellers. For example the log may contain the identity of each seller and for each seller the following data:

Identities of buyers;
Identification of the content (material) sold;
The price;
Total sales;
Analysis of sales by genre;
Analysis of sales by country or /region; and/or
Details of material for which a user license has expired.

Modifications

Various modifications may be made to the second example.

The second example has been described with reference to a server-client system in which the server stores the material and provides the interfaces between it and the clients for registering sellers and buyers and for designing watermarks and for financial transactions. However, the present invention may be applied in the context of a peer to peer network in which at least the material is stored on many stores, e.g. 112S. For example each seller may store their own material and a server (such as server 1) acts to provide general organisation of the network.

This peer to peer network structure is preferably used in the pull mode discussed above. That is potential buyers use metadata relating to the content stored on the server 1 to find content they are interested in. The buyer may access the watermarked material directly from storage associated with the seller client processor 112 via the network 4. Alternatively the buyer may be sent a watermarked tape to preview. If a buyer decides to purchase, and pays for the material then he is sent the license file including the removal data needed to remove the watermark.

Whilst the second example uses interfaces via which sellers and buyers must register manually to offer material for sale and to buy it, the present invention may provide an automatic registration and purchase of material via a "transparent" interface. For example, a trusted organisation such as a major broadcaster has an account with a seller to access material from them. The terms of sale of material are agreed in advance with the seller. The broadcaster is provided with a pre-configured ID on a secure store for example a smart card which identifies the broadcaster to the system. A video editor employed by the broadcaster uses the system of the second example to access a video clip which he requires without the need to register; that is done automatically when he chooses a clip to be downloaded to him. The clip is downloaded with the license file containing the secret removal data enabling the watermark to be removed from the clip (and also the fingerprint added to it).

In any of the examples set out above, the material may be robustly and invisibly watermarked before it is visibly watermarked.

Whilst the invention has been described with reference to video, it may be applied to audio. An audible distortion is added to the audio but the distortion allows a listener to appreciate what the audio signal represents. The distortion is robust against unauthorised removal but is removable to restore the original audio.

The seller client may interact on-line with the transaction server to create the watermark.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of watermarking and transferring watermarked material in a system including a transaction server, first and second clients, a first apparatus for applying a perceptible watermark to the material and second apparatus for removing the watermark, the method comprising the steps of:

transferring from the transaction server to the first apparatus (i) data for creating a watermark, the creating data including (a) data defining an invertible algorithm and (b) data for creating at least one security key associated with the algorithm and (ii) data for creating a material identifier;

using said first apparatus to apply a material identifier to the material and to apply a perceptible watermark to the material in accordance with the invertible algorithm, wherein the perceptible watermark is applied to the material as part of a compression of the material, and the invertible algorithm provides a perceivable impairment to the material;

transferring from the first client to the transaction server said material identifier and data for inverting the algorithm including said at least one key;

transferring the watermarked material to the second client;

deriving said material identifier from the material;

transferring the identifier from the second client to the transaction server;

subject to predetermined conditions being satisfied, transferring from the transaction server to the second apparatus watermark removal data associated with said material identifier, the removal data including the at least one key and data defining an algorithm for removing the watermark in conjunction with the at least one key; and using the second apparatus to remove the perceivable watermark using said removal data, so as to remove the perceivable impairment from the material.

2. The method according to claim 1, wherein the first apparatus compresses the material and applies the watermark as part of the compression process.

3. The method according to claim 1, wherein said data defining the invertible algorithm comprises algorithm configuration data.

4. The method according to claim 1, wherein said data defining the invertible algorithm comprises the algorithm.

5. The method according to claim 1, wherein data for creating the material identifier is stored in a data carrier for transfer to the first apparatus.

6. The method according to claim 1, wherein said data for creating a watermark is stored in a data carrier for transfer to the first apparatus.

7. The method according to claim 6, wherein a material identifier and the at least one key are generated during the application of the watermark to the material, and the method further comprising the step of:

storing the generated identifier and key on the data carrier for transfer to the first client.

8. The method according to claim 1, further comprising the step of:

storing, in the transaction server, metadata relating to said watermarked material, wherein the metadata is referenced by said identifier.

9. The method according to claim 1, wherein said removal data is stored in a data carrier for transfer to the second apparatus.

10. The method according to claim 1, further comprising the step of:

storing, on the transaction server, conditions of sale of unwatermarked material.

11. The method according to claim 10, further comprising the step of:

transferring said conditions of sale from the first client to the transaction server.

12. The method according to claim 10, wherein the transaction server transfers said removal data subject to the condition that a buyer has fulfilled the conditions of sale.

13. The method according to claim 1, further comprising the step of:

storing the watermarked material in a recording medium and transferring the watermarked material to the second apparatus on the recording medium.

14. A computer readable storage medium that includes at least one data structure configured to store information, which when executed by a computer causes the computer to perform a method of watermarking and transferring watermarked material in a system including a transaction server, first and second clients, a first apparatus for applying a perceptible watermark to the material and a second apparatus for removing the watermark, the method comprising steps of:

transferring from the transaction server to the first apparatus (i) data for creating a watermark, the creating data including (a) data defining an invertible algorithm and (b) data for creating at least one security key associated with the algorithm and (ii) data for creating a material identifier;

using said first apparatus to apply a material identifier to the material and to apply a perceptible watermark to the material in accordance with the invertible algorithm, wherein the perceptible watermark is applied to the material as part of a compression of the material, and the invertible algorithm provides a perceivable impairment to the material;

transferring from the first client to the transaction server said material identifier and data for inverting the algorithm including said at least one key;

transferring the watermarked material to the second client;

deriving said material identifier from the material;

transferring the identifier from the second client to the transaction server;

subject to predetermined conditions being satisfied, transferring from the transaction server to the second apparatus watermark removal data associated with said material identifier, the removal data including the at least one key and data defining an algorithm for removing the watermark in conjunction with the at least one key; and using the second apparatus to remove the perceivable watermark using said removal data, so as to remove the perceivable impairment from the material.

15. The computer readable storage medium according to claim 14, wherein the computer readable storage medium is a smart card, and the smart card comprises a processor and a memory unit, wherein the processor is programmed to implement said algorithm.

16. The computer readable storage medium according to claim 14, wherein the computer readable storage medium is a smart card, and the smart card comprises a memory unit configured to store algorithm configuration data defining the invertible algorithm.

17. A system comprising:

a transaction server configured to transfer data for creating a watermark and data for creating a material identifier to a first apparatus, wherein the data for creating the watermark includes data defining an invertible algorithm and data for creating at least one security key associated with the algorithm;

the first apparatus configured to apply a material identifier to the material and to apply a perceptible watermark to the material in accordance with the invertible algorithm, wherein the perceptible watermark is applied as part of a compression of the material, and the invertible algorithm provides a perceivable impairment to the material;

a first client configured to transfer said material identifier and data for inverting the algorithm including the at least one key to a transaction server;

the first client further configured to transfer the watermarked material to a second client;

the second client configured to derive said material identifier from the watermarked material and to transmit the material identifier to the transaction server;

the transaction server configured to, subject to predetermined conditions being satisfied, transfer watermark removal data associated with the material identifier to the second client, the removal data includes the at least one key and data defining an algorithm for removing the watermark in conjunction with the at least one key; and a second apparatus configured to remove the watermark using the removal data.

18. The system according to claim 17, wherein said material is video material.

19. The system according to claim 17, wherein said material is audio/visual material.

20. The system according to claim 17, wherein said material is audio material.

21. The system according to claim 17, wherein said material is data material.

22. The system according to claim 17, wherein the first apparatus comprises:
- an information material processing apparatus operable to receive signals representative of information material, and to adapt said signals to an effect of introducing a reversible modification to said information material in accordance with a modification key, said modification being arranged to provide a disturbing effect on the information material to a human recipient by compressing the information material to provide the disturbing effect in accordance with an invertible algorithm;
- a data generation processor operable to generate data identifying said information material,
- a recording apparatus operable to record said adapted signals and said identifying data on a recording/reproducing medium, and
- a data processor operable to receive said identifying data and said modification key and to store said identifying data and data representative of said modification key data on a data carrier.

23. The system as claimed in claim 22, wherein said recording/reproducing medium is a linear recording medium including capacity for ancillary data, and said identifying data is recorded in said capacity for recording ancillary data.

24. The system as claimed in claim 22, wherein said data carrier is a hand insertable carrier.

25. The system as claimed in claim 24, wherein said data carrier is a smart card.

26. The system as claimed in claim 22, wherein said identifying data is a Unique Material Identifier.

27. The system as claimed in claim 22, wherein said apparatus further comprises:
- an information material server arranged to store signals representative of information material, and to retrieve selected signals representative of selected information material items, said information material processing apparatus being operable to adapt said selected signals, said data generation processor being operable to generate said data identifying said selected information material signals.

* * * * *